United States Patent [19]

Leonard

[11] Patent Number: 4,589,164
[45] Date of Patent: * May 20, 1986

[54] VARIABLE TENSION DEVICE WITH ADJUSTABLE FEATURES FOR SPRING RATE, INITIAL TENSION AND CONNECTION TO EXTERNAL PARTS

[75] Inventor: George H. Leonard, Darien, Conn.

[73] Assignee: Airpot Corporation, Norwalk, Conn.

[*] Notice: The portion of the term of this patent subsequent to Feb. 25, 2003 has been disclaimed.

[21] Appl. No.: 618,897

[22] Filed: Jun. 8, 1984

[51] Int. Cl.⁴ .............................................. E05F 1/08
[52] U.S. Cl. ...................................... 16/299; 16/308; 16/DIG. 36; 267/154; 403/397
[58] Field of Search ..................... 16/50, 75, 299, 300, 16/301, 308, DIG. 36; 403/397; 267/57, 154

[56] References Cited

U.S. PATENT DOCUMENTS

| | | | |
|---|---|---|---|
| 397,366 | 2/1889 | Jarrell | 16/308 X |
| 3,022,536 | 2/1962 | Floehr | 16/308 |
| 3,377,882 | 4/1968 | Schrempp | 16/308 X |
| 3,476,375 | 11/1969 | Brasseur | 16/308 X |
| 3,787,923 | 1/1974 | Peterson | 16/308 |
| 3,965,533 | 6/1976 | Frohlich | 16/300 |
| 4,309,120 | 1/1982 | Werthmann | 403/397 X |

FOREIGN PATENT DOCUMENTS

| | | | |
|---|---|---|---|
| 918 | of 1876 | United Kingdom | 16/308 |
| 378468 | 8/1932 | United Kingdom | 16/308 |

Primary Examiner—Fred Silverberg
Attorney, Agent, or Firm—James & Franklin

[57] ABSTRACT

In a variable tension device having an elongated torsion member adapted to be connected at axially spaced points to a relatively fixedly mounted support and to an object rotatably movable relative to said support, novel structure is provided for adjusting (a) the effective length of the torsion element, thereby to vary the effective spring rate, (b) the angular anchor position of that portion of the torsion bar secured to the support, and (c) the axial and, if desired, angular position relative to the torsion element of the member connecting that element to said external object.

33 Claims, 22 Drawing Figures

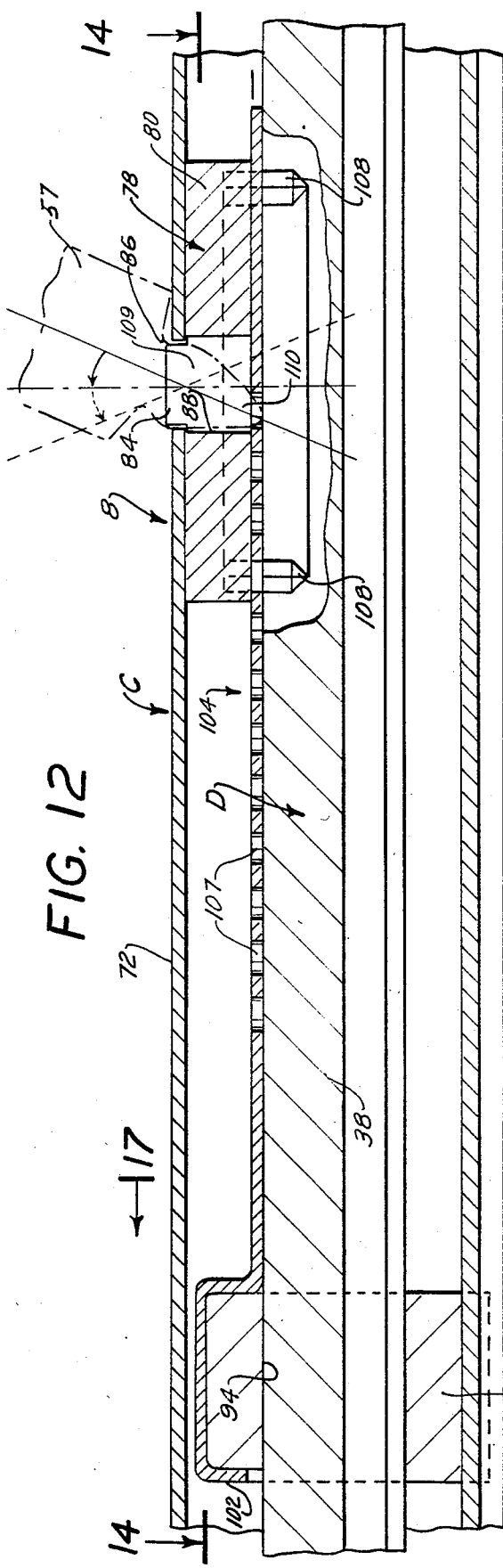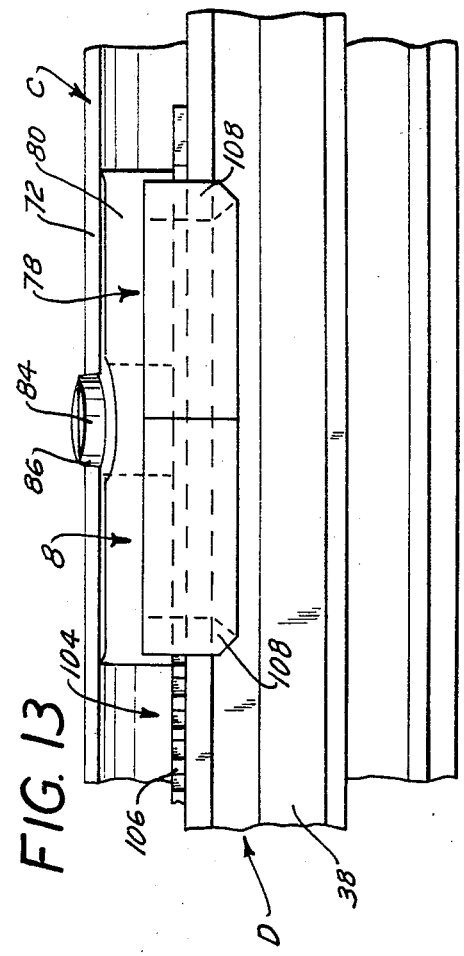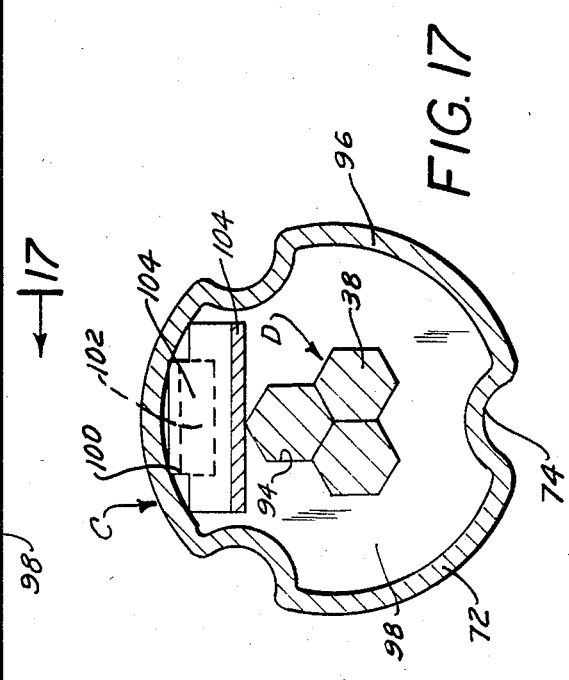

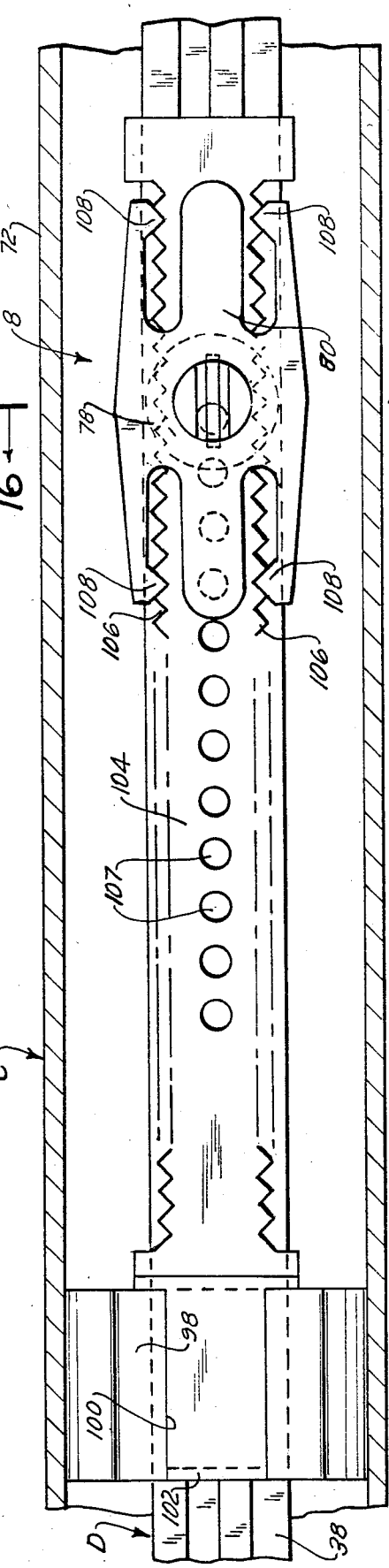
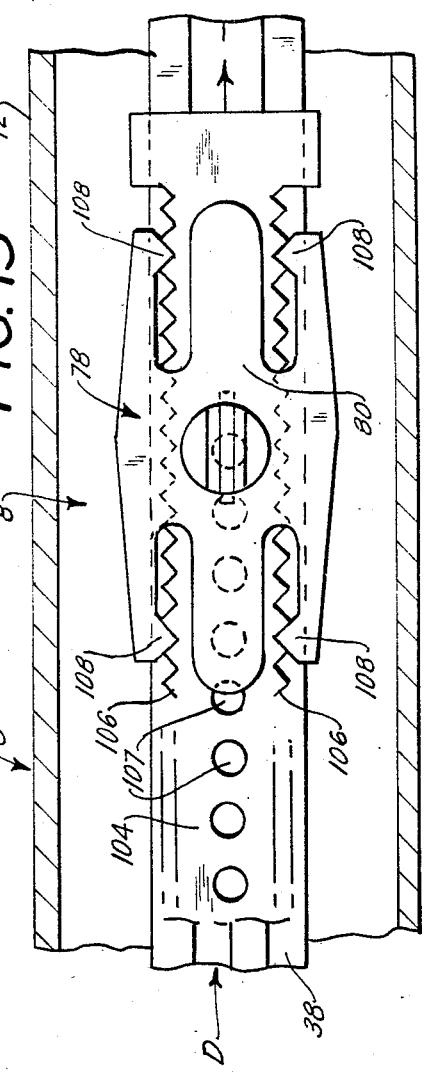
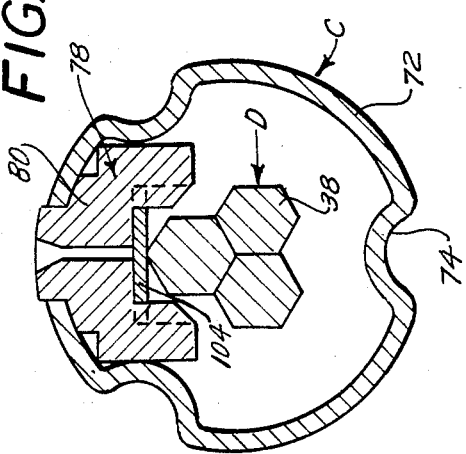
FIG. 14
FIG. 15
FIG. 16

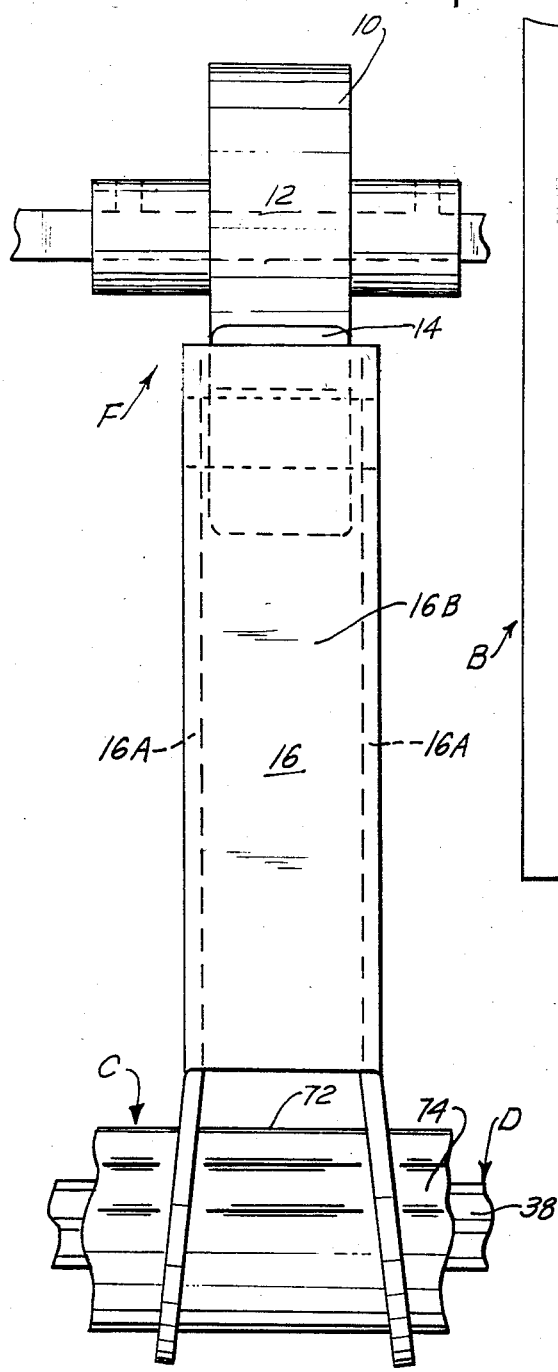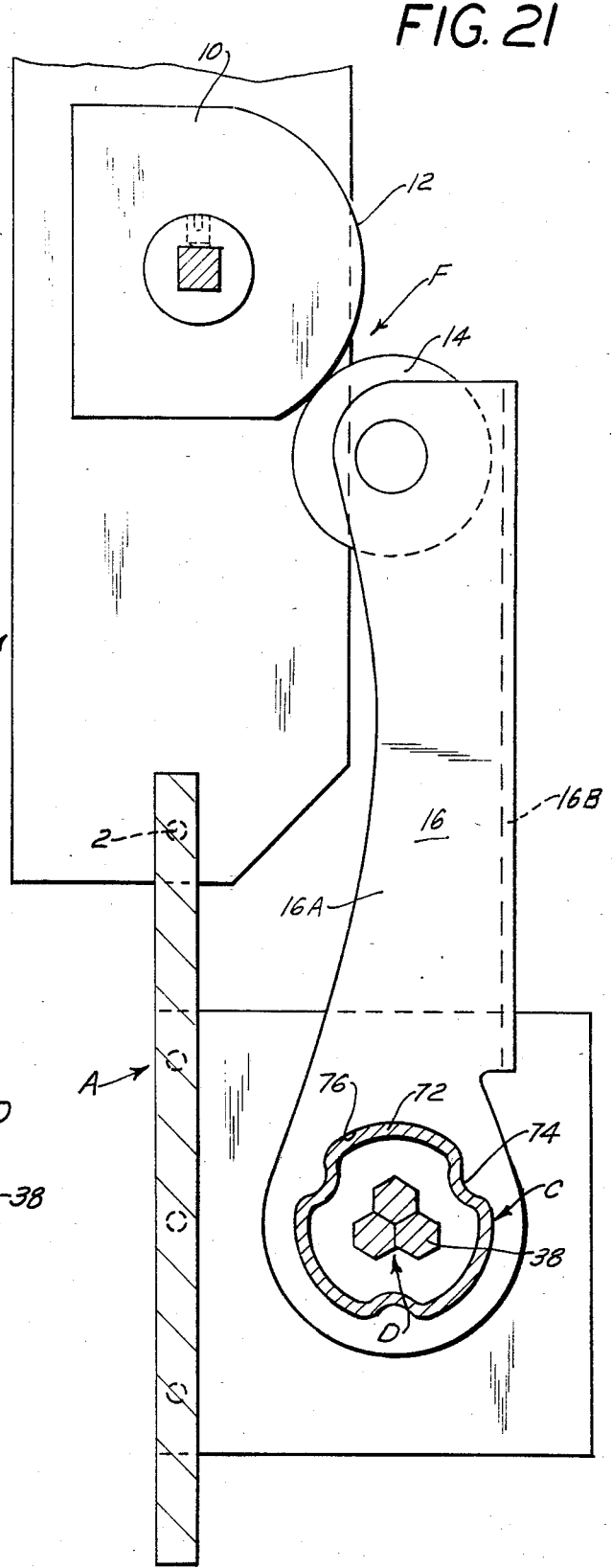

ND CONNECTION TO
VARIABLE TENSION DEVICE WITH ADJUSTABLE FEATURES FOR SPRING RATE, INITIAL TENSION AND CONNECTION TO EXTERNAL PARTS

The present invention relates to a variable tension device effective to act between two parts articulately movable relative to one another in which the variable tension is achieved through the twisting of a torsion element, and in particular to means for providing adjustability of various aspects of the device so that a given standard device construction may be readily adapted for use in different specific environments.

BACKGROUND OF THE INVENTION AND DESCRIPTION OF THE PRIOR ART

Variable tension devices using torsion members are used in many different circumstances. One such use is as a variable counterbalance device, such as is disclosed in the copending application Ser. No. 477,337 of Mar. 21, 1983 entitled "Counterbalance Device and Torsion Member Usable Therein", with respect to which continuation application Ser. No. 712,757 was filed on Mar. 18, 1985, filed by the inventor herein and assigned to the assignee of this application. The structure of the present invention will be here specifically described in connection with a counterbalance device of that general type, but it will be understood that the torsion device of the present invention is suitable for use in many other environments.

Counterbalance devices of the type used to illustrate the applicability of the device in the present invention are employed where one part is articulately connected to another so as to be movable between first and second positions, the nature of that part being such that its effective weight varies as it thus moves. For example, when a heavy lid is lifted from a horizontal position to a vertical position, it seems heaviest at the beginning of that movement and its effective weight decreases as it moves toward its vertical open position. Hence the force necessary to move it is greatest when the lid is horizontal and least when the lid is vertical, thus creating a tendency to slam the lid into its vertical position and also, because of the effective weight of the lid, tending to cause the lid to slam into its horizontal position. In addition, under normal circumstances, if the lid is released in an intermediate position it will tend to fall back to its horizontal position, usually with considerable force. Consequently, counterbalance devices are employed, which are effective to minimize the differences in apparent weight of the lid as it moves from one operative position to the other, and preferably effective to exert a force on the lid at any given intermediate position which is substantially equal and opposite to the force that the lid would normally exert, so that if the lid is released in an intermediate position it will tend to stay in that position.

Actual physical counterbalancing by means of an added and appropriately located weight involves significant problems of weight, space, cost and safety. Therefore many different artificial counterbalancing devices have been proposed, but few if any can produce perfect or neutral counterbalancing (by neutral counterbalancing is meant counterbalancing such that the lid will remain in whatever position it finds itself, and will exert a smooth, low resistance to movement from that position) without complex and expensive structure, and most take up a significant amount of space and add significant weight to the overall construction. Many such devices utilize hydraulic or pneumatic cylinders, which are subject to significant maintenance problems. Springs, including torsion springs, have been used in the past for this purpose, but they either are extremely bulky, heavy and expensive or they can be used only for relatively light work. Even the bulkiest spring hinge becomes unsuitable when truly heavy lids are involved, and for such heavy lids the art has turned to the use of hydraulic shock absorbers or gas springs, but they are significantly more costly, present very substantial space problems, and obstruct side access when the lid is lifted.

Moreover, torsion spring assemblies as used in the past have involved structures individually designed for a particular application. When a new application calling for even a slightly different torsion characteristic is presented, a new and different structure must be designed for that purpose. This adds greatly to the cost of such devices. Moreover, adjustability of such structures, to accommodate external or internal changes or to make a given structure adaptable for use in a plurality of environments, is difficult and unreliable.

The structure disclosed in the aforementioned application Ser. No. 477,337 was quite effective in achieving its desired objective, but additional experience with that construction has led to an appreciation of certain areas where improvements were appropriate, particularly with regard to cost and reliability of manufacture and adaptability to different specific environments.

SUMMARY OF THE INVENTION

Different applications often present different problems to the variable tension device. In one instance the element to be counterbalanced may rotate through 180°, while in another instance that element may only rotate through 90°. When rotation through more than 90° is required, counterbalancing in opposite directions for different rotational positions may be called for. Raised positions for the lid or other element to be counterbalanced may vary widely from installation to installation. Lids may be at rest when horizontal, inclined, vertical or combinations of these positions. In order for a variable tension device of standard construction to be effective in all of these instances, the initial rotative anchor position of the end of the torsion element adapted to be secured to the relatively fixed support is very important; it must be adjustable, and with a reasonable degree of precision. Although the lid or other movable element may be rotated through 90° or more, the torsion element is usually twisted through a much smaller angle, such as 40°, thus emphasizing the criticality of initial anchoring position.

In addition, and as is pointed out in the aforementioned application Ser. No. 477,337, it is highly desirable to be able to adjust the effective length of the torsion element in order to vary the spring rate thereof, thereby to permit the torsion device to produce the torsional forces required for a given torsion element rotation in each individual application. It is highly advantageous if this adjustment can be done with the tension device in place and without the need to remove the torsion member from its assembled position.

A standardized construction should not only be readily adaptable to different requirements for operating characteristics, but also should be adaptable to different structural conditions. For example, torsion elements may be used for counterbalancing purposes in devices which vary widely from a geometrical point of view. Different mounting lengths may be required in different installations even though the desired operating characteristics may be similar. The connection between the torsion member and the relatively movable external object may have to be located at different positions along the length of the torsion member, and frequently also at different rotational positions therearound, depending upon the particular installation. Accommodation to these varying requirements should be independent of, and not conflict with, the adjustments of initial anchoring position and spring rate previously referred to.

Moreover, once the torsion device becomes a part of a given installation, it may well be located relatively inaccessibly. In particular its ends may be up against parts of the basic structure with which it is used, so that access to the tension device ends is difficult if not impossible. It therefore is highly desirable to be able to effect adjustment of anchor position, spring rate and location of the members which connect the torsion member to the external object when the ends of the torsion device cannot be reached.

It is the prime object of the present invention to provide a variable tension device using a torsion member with means for independently adjusting one or more of (a) spring rate, (b) initial anchor position, and (c) physical location of the connection to the external object, each of which adjustments can be readily accomplished.

It is another object of the present invention to provide such adjustments by reliable, simple and inexpensive yet highly effective structures.

It is a further object of the present invention to so construct a torsion element variable tension device that its parts are inexpensive yet reliable and are highly conducive to adjustments of the type described.

It is yet another object of the present invention to devise such a construction in which the basic tension device construction is adaptable for use in applications differing widely from a structural point of view, where the adjusting structure and manipulation are independent of device length, and in which the adjustments in question can be readily made even though the torsion devices may be located in relatively inaccessible positions, and particularly where the ends of the torsion devices are not accessible.

In accordance with the present invention, the above and related objects are collectively achieved, in the specific counterbalance device here illustrated, by so constructing the torsion member and associated structure that the part or parts connecting the torsion member to the external object may be connected to the torsion member at a plurality of rotative positions and may be readily axially moved along the length of the torsion member, by providing means whereby the normally non-rotatable connection between an end of the torsion member and the relatively fixedly mounted support can be released and adjusted preferably within close limits and preferably at any location within a complete 360° range, so that the initial anchor position of the torsion element end can be made optimally, and by providing means whereby the non-rotatable connection between the external object and the torsion member may be shifted axially of the torsion member to vary the effective length thereof.

In the specific embodiment here illustrated, as in the embodiment illustrated in application Ser. No. 477,337, the torsion member is surrounded by a sleeve rotatable relative thereto. As here disclosed, that sleeve is provided with axially extending outer and inner protrusions, as by being fluted. The means which connects the sleeve to the external object mates with the external flutes of the sleeve, thereby to be adjustably axially positionable along the sleeve and to have a plurality of fixed rotative positions relative to the sleeve but to be rotatable with the sleeve. Connection between the sleeve and the torsion member is by means of a part which rotates with but is axially slidable along the torsion member and which on its exterior mates with the internal flutes on the sleeve so as to rotate with the sleeve. A link is engaged with that part located between the torsion member and the sleeve and extending axially of the torsion member. The sleeve at an appropriate point is provided with an aperture providing access to that link, through which aperture a tool may be inserted to engage the link and move it axially of the torsion member, causing the part rotatably connecting the sleeve and the torsion member to correspondingly move, thereby to change the effective length of the torsion member and hence the spring rate thereof. The end of the torsion member is provided with a toothed element which becomes rotationally fixed relative to the support by means of a coupling member which can be moved between coupling and uncoupling positions. When the coupling member is moved to uncoupling position the rotational position of the end of the torsion element relative to the support may be adjusted, after which the coupling element again is moved to coupling position. In order that the anchor position may be finely adjusted, the engagement between the torsion member and the coupling member and the engagement between the coupling member and the support are accomplished by sets of gear teeth respectively having slightly different pitches. Access is provided to the coupling member and to the torsion member adjacent the coupling member from the side of the torsion device so that the parts may be manipulated and adjusted even if the torsion member is located in a "blind" position, and the sleeve aperture through which one may reach the link which produces spring rate adjustment is also located in a readily accessible manner on the side of the device.

The torsion member and the sleeve may be standard for all embodiments, and need simply be cut to appropriate length for a given installation. The other parts are also standard, and need merely be slid onto or otherwise affixed to the ends of the torsion element and sleeve after the latter have been cut to length. It will be appreciated that this represents a very substantial saving and production cost.

BRIEF DESCRIPTION OF THE DRAWINGS

To the accomplishment of the above, and to such other objects as may hereinafter appear, the present invention relates to a variable tension device as defined in the appended claims, and as described in this specification, taken together with the accompanying drawings, in which:

FIG. 12 is an enlarged fragmentary cross-sectional view taken of a portion of the sleeve C and the structure contained therein;

FIG. 13 is a fragmentary side elevational view of the spring length of the torsion member length adjusting parts;

FIGS. 14 and 15 are top plan views of the parts of FIG. 13, showing those parts in different positions;

FIG. 16 is a cross-sectional view taken along the line 16—16 of FIG. 14;

FIG. 17 is a cross-sectional view taken along the line 17—17 of FIG. 12;

FIG. 20 is a front elevational view of the cam-follower parts and their mounting; and FIG. 21 is a side elevational view of the parts of FIG. 20.

DESCRIPTION OF THE PREFERRED EMBODIMENTS

Figure 1:
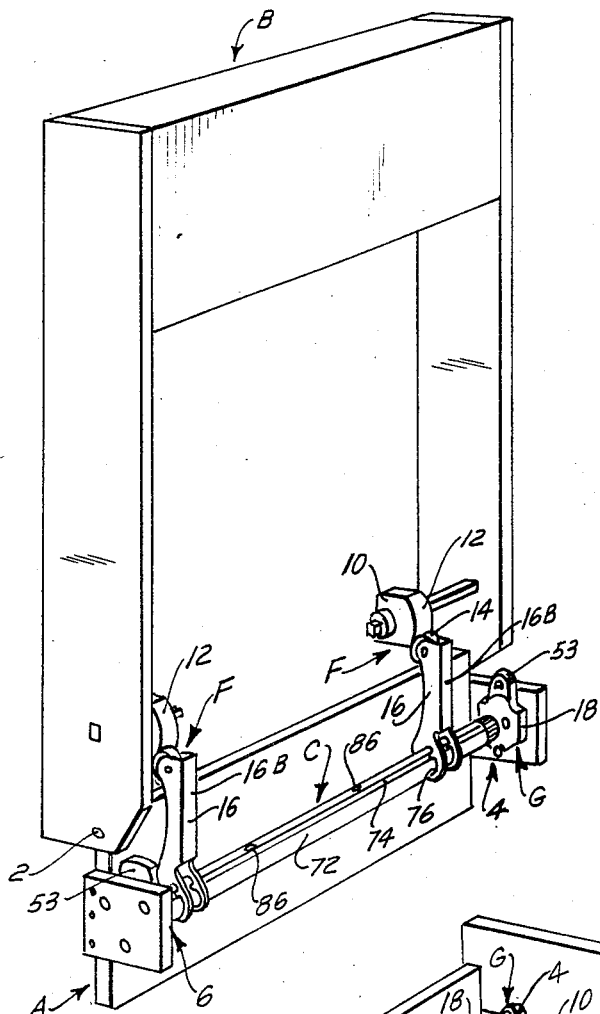
FIG. 1 is a three quarter perspective view of a counterbalance device utilizing the torsion device of the present invention, which counterbalance device is active on a pivotable external part, the part being shown in vertical position.
Figure 2:
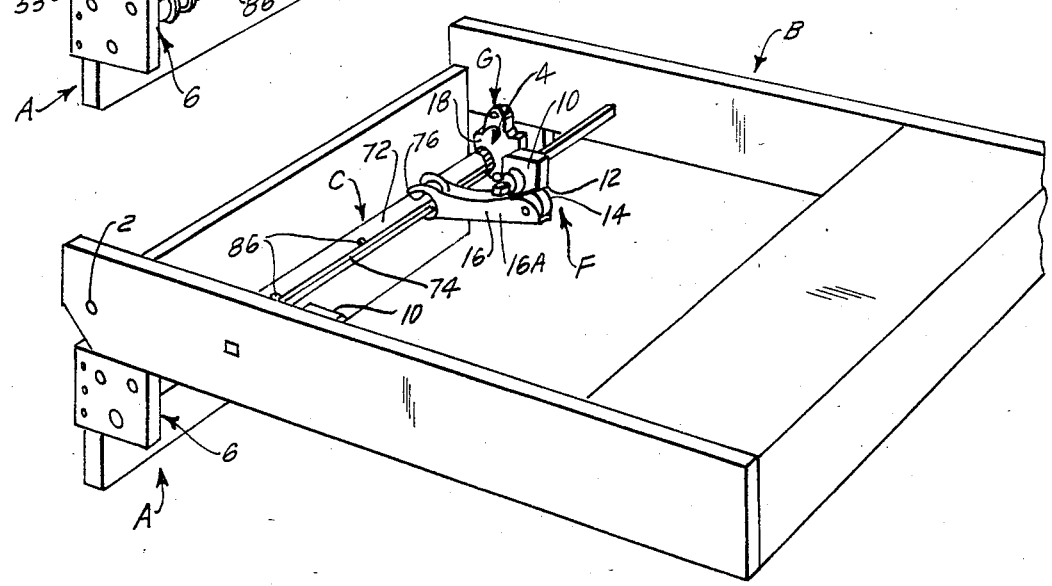
FIG. 2 is a view similar to FIG. 1 but showing the part in horizontal position.

The variable tension device of the present invention, as has been indicated, is here specifically disclosed in an environment where it is designed to counterbalance two articulating connected parts generally designated A and B, here shown more or less generically because of the wide variation possible in the nature of those parts. Part A is the fixed part, and part B is the movable part which is to be counterbalanced. Part B is pivotally connected to part A by pivot axis 2 to move between a horizontal position corresponding to a closed lid and a vertical position corresponding to an open lid (FIGS. 2 and 1 respectively). A portion of part B is made open so that the counterbalance device can be seen when the part B is in its horizontal position. Part B may be of appreciable weight. When it is in its vertical position shown in FIG. 1 that weight is wholly carried by the shaft 2, so little or no force is required to move the lid from its vertical position, but when the lid is in its horizontal position, as shown in FIG. 2, its weight acts downwardly at points remote from the shaft 2, so that a considerable amount of force is required to lift it. As the lid B is moved from its horizontal to its vertical position, the amount of force required to move it will progressively decrease, according to the cosine of the angle through which it is moved. What is desired is to counterbalance the part B, so that it will tend to remain in whatever position it may be placed, the counterbalancing force equalling and opposing the effective weight of the part B for that particular position.

The variable tension device of the present invention comprises an elongated torsion member generally designated D which, in the balanced or symmetrical form shown, is non-rotatably but adjustably secured adjacent to its ends, at points severally designated 4 and 6 respectively, to the fixed part A. The torsion member D is surrounded by a sleeve generally designated C, which is rotatable relative to the fixed part A generally independently of the torsion member D but which is non-rotatably secured to the torsion member D at points 8 and 9 spaced, preferably equidistantly, from the points 4 and 6 respectively. Such rotation of the sleeve C with respect to the fixed support A will twist those lengths of the torsion member D between the points 4 and 8 and the points 6 and 9 respectively, and that torsion member will therefore exert a restraining force at least roughly proportional to the degree to which it is twisted.

A cam-follower combination generally designated F is provided, one part of which is secured to the sleeve C and the other part which is secured to the part B. As here disclosed the part B carries a cam 10 having a cam surface 12 over which a cam follower 14 rides, the cam follower 14 being mounted on the sleeve C by means of arm 16. Because of the desired symmetrical or balanced nature of the construction shown, two sets of cam-follower combinations F are provided, one near each end of the sleeve C. The cam mounting shown is illustrative only. The cam surface 10 may be configured to provide, within limits, a wide variety of different position-spring action relationships, i.e. detenting, balancing, biasing in one direction or the other, etc.

At each end of the torsion member D an adjustable mounting structure generally designated G is provided, by means of which the ends of the torsion member D may be fixed to the part A in any one of a plurality of desired rotative anchor positions. As here specifically disclosed the part A defining the support for the device is provided at each end with a mounting pocket shaped to accept the anchor block 18 provided at either end of the sleeve C. Where no pocket is provided, screws may be used to mount the anchor block 18 securely to part A.

The anchor block 18 has a mounting aperture 20 provided with internally projecting teeth 22 that engage external teeth 28 on a coupling member 26, which is in the form of a ring. The center of the ring 26 is defined by an axially facing through opening 34 with internal teeth 36.

Figure 5:
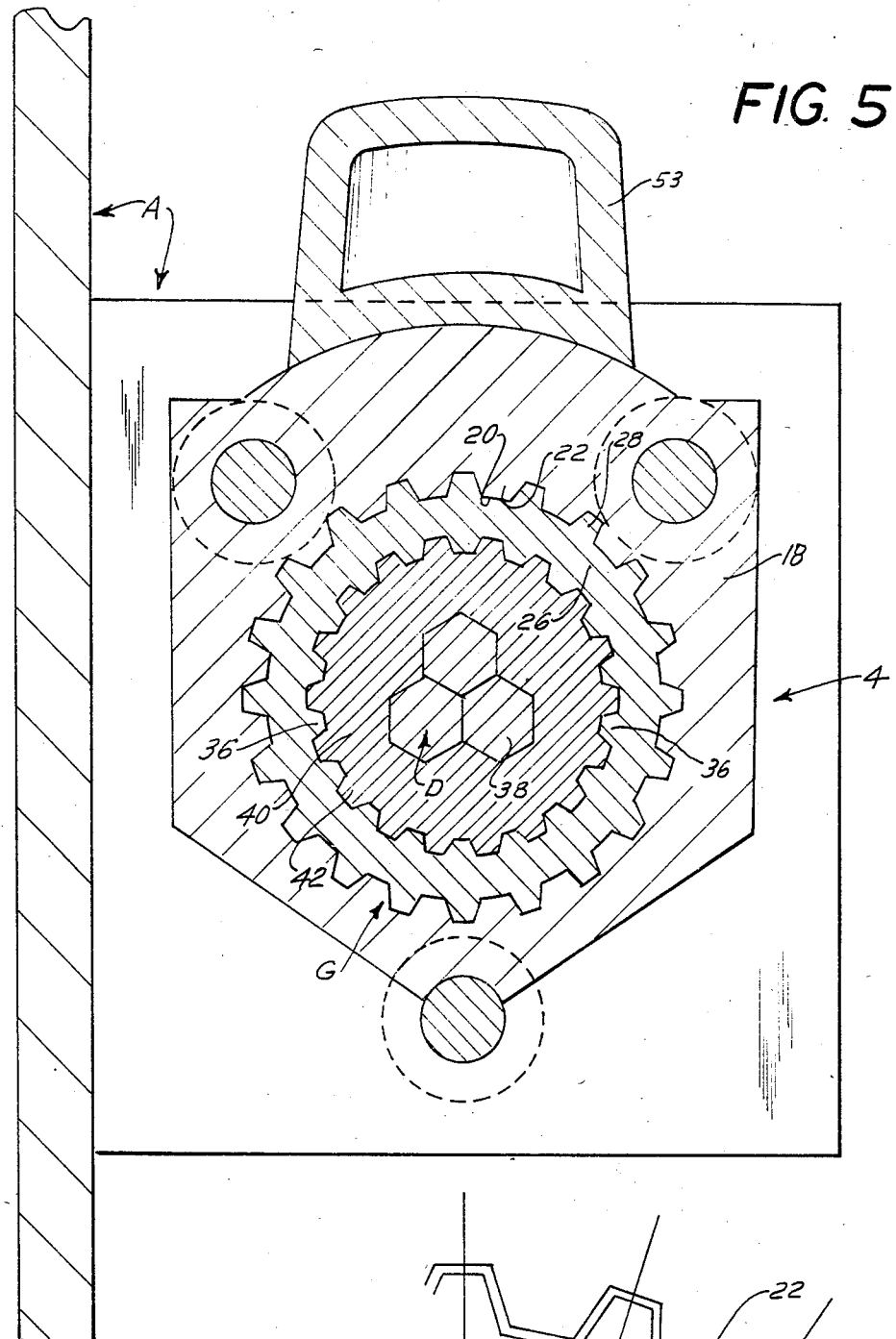
FIG. 5 is a cross-sectional view taken along the line 5—5 of FIG. 4.
Figure 5A:
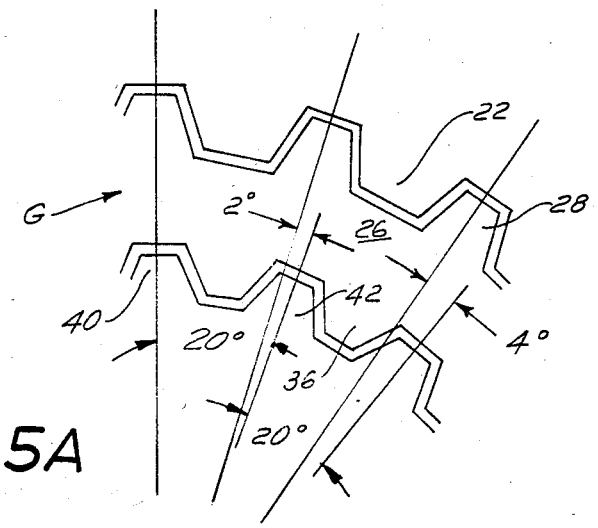
FIG. 5A is a diagrammatic view illustrating the different pitches of the sets of gear teeth on the parts disclosed in FIG. 5.
Figure 6:
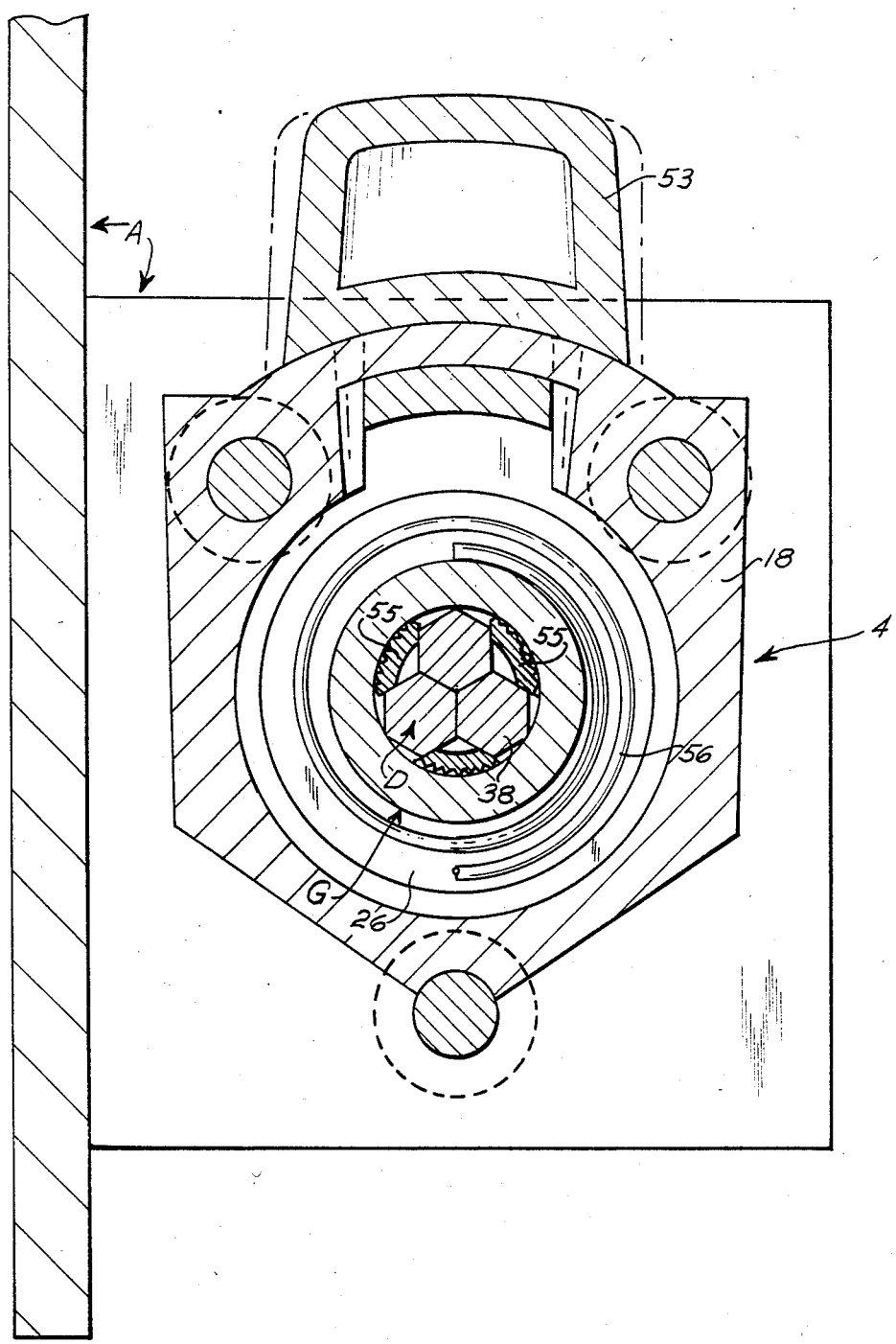
FIG. 6 is a cross-sectional view taken along the line 6—6 of FIG. 4.
Figure 7:
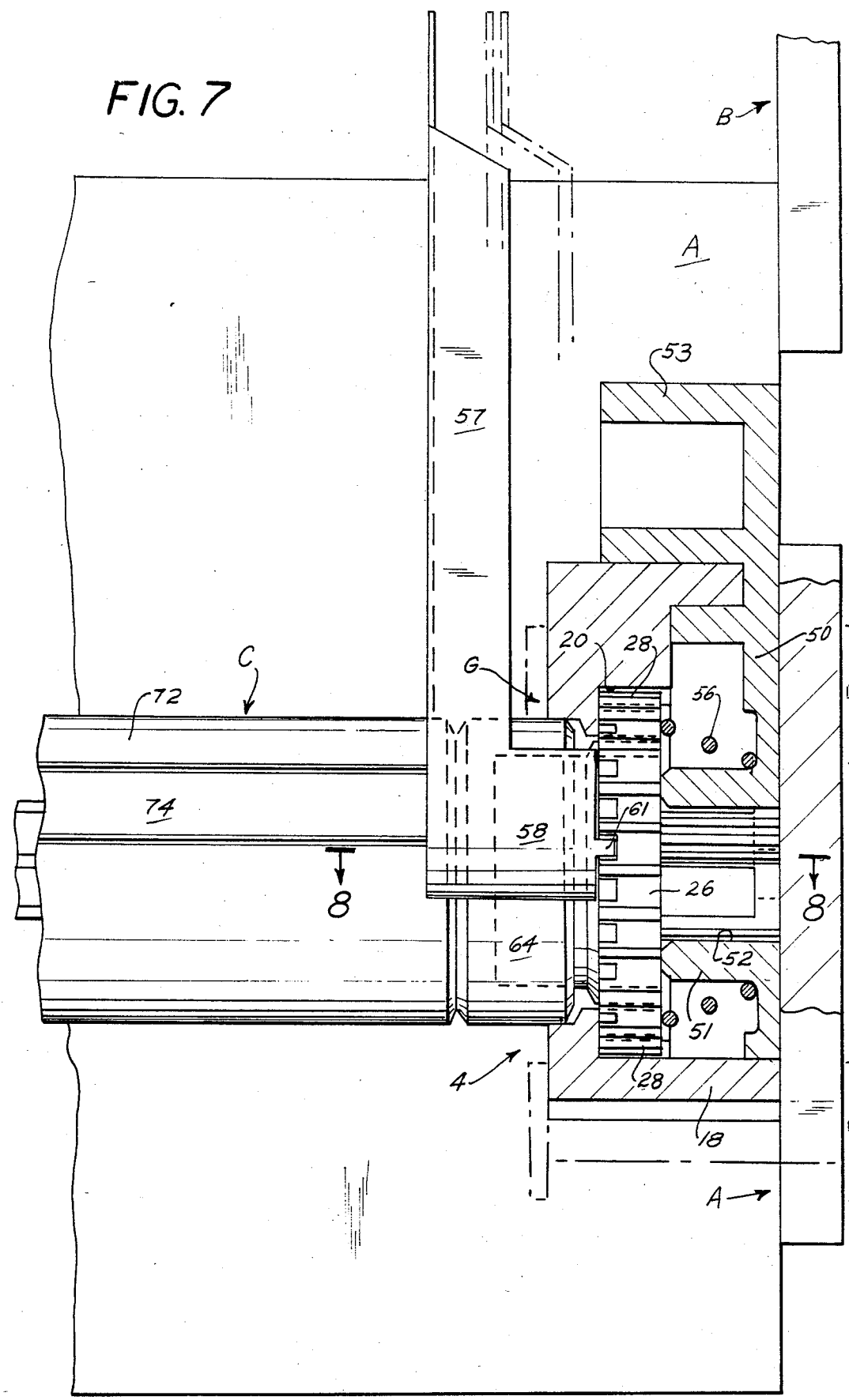
FIG. 7 is a side elevational view, partly broken away and cross-sectional, similar to FIG. 4 but showing the action of the tool used for adjusting the initial position of the operative parts.

The torsion member D is here shown as formed of three elongated metal rods 38 assembled with peripheral surfaces in engagement according to the teachings of aforementioned application Ser. No. 477,337. A sleeve-like end element 40 is loosely slidably mounted near the ends of the torsion member D. Because its inner opening mates with the non-circular periphery of the bunched group of rods 38, it is non-rotatable relative to that portion of the torsion member D which it engages. The outer periphery of the sleeve-like part 40 is provided with external teeth 42, the part 40 being received within the central through aperture 34 of the ring 26 with the teeth 42 engaging the teeth 36. All of the teeth in question may be of conventional gear teeth shape, but that is not essential, it being necessary only that the teeth of each set when engaged with one another limit relative rotation, the engagement preferably providing appreciable looseness (see FIG. 5A) so that the intermeshing of the teeth can readily be accomplished when adjustment is desired.

Figure 4:
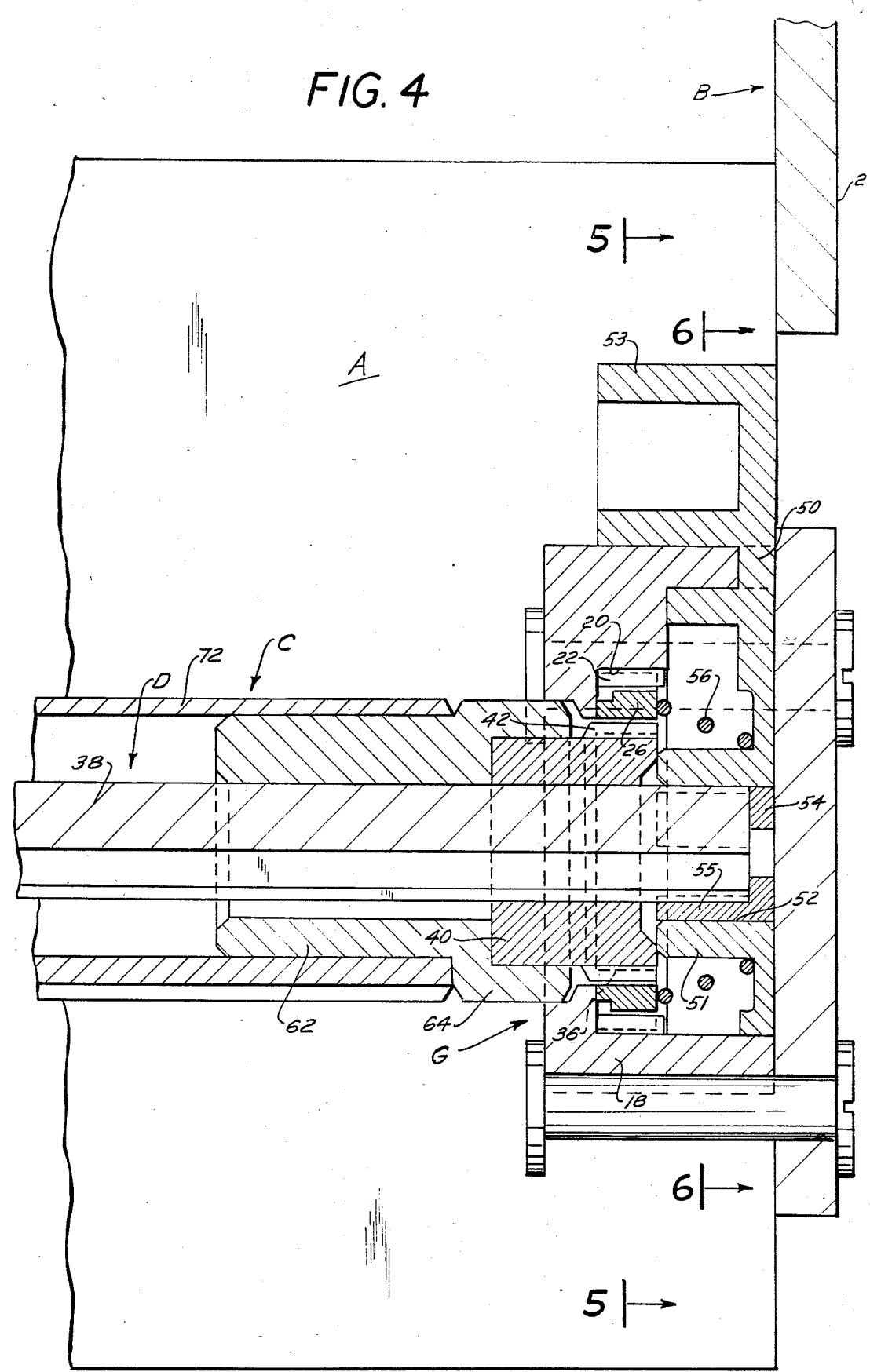
FIG. 4 is a vertical cross-sectional view of the right-hand end of the counterbalance device of FIG. 3, the lefthand end thereof being a mirror image thereof.
Figure 8:
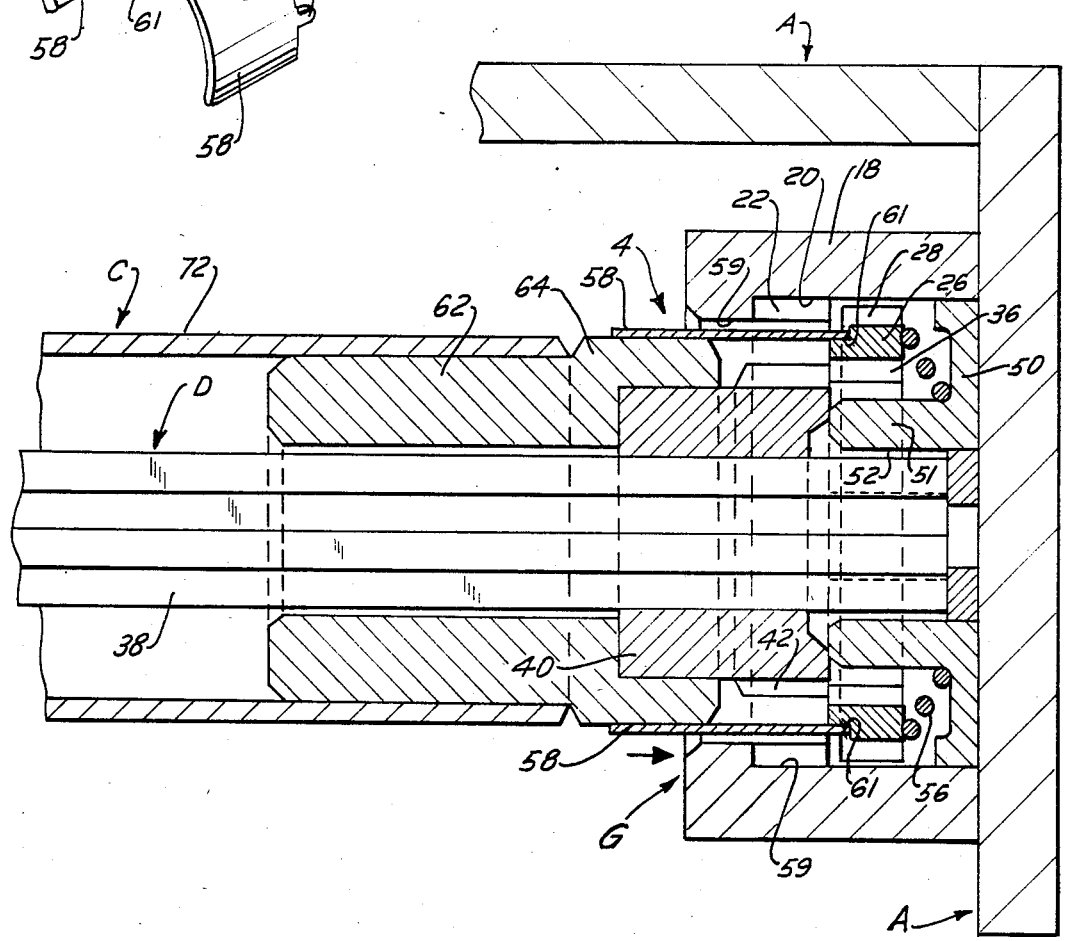
FIG. 8 is a cross-sectional view taken along the line 8—8 of FIG. 7 and showing the adjusting parts in an intermediate position.

When the ring 26 is in its operative position, as shown in FIG. 4, in which its internal teeth 36 engage the teeth 42 on the part 40 secured near the end of the torsion member D, while at the same time the external teeth 28 of the ring 26 engage the internal teeth 22 on the anchor block 18, the end of the torsion member D is rotatively anchored. If the rotational position of the torsion member D is to be changed, the coupling ring 26 may be slid to the right until it disengages itself from the part 40 (See FIG. 8), the corresponding end of the torsion member D may be rotated to a new position, and the ring 26 may then be moved back to its position engaging part 40.

This will permit adjustment of the rotative position of the end of the torsion member D only in increments corresponding to the angular pitch of the teeth 36, 42. If more precise adjustment of the anchor position is desired, the teeth 22, 28 may be provided with a slightly different angular pitch than the teeth 36, 42, (See FIG. 5A) and the coupling ring 26 may be moved to a position (See FIG. 9) in which it is not only disengaged from the sleeve 40 but also from the anchor block 18. Then it may be moved back into engagement with the anchor block 18 at a different rotative position relative thereto, and that adjustment, in combination with the adjustment of the rotative position of the part 40, can produce a much finer adjustability of the anchor position. For example, as may be seen from FIG. 5A, if the effective pitch of the teeth 36, 42 is 20° and the effective pitch of the teeth 22, 28 is 18°, it is possible to achieve control of the anchor position of the end of the torsion member D in 2° steps.

As may perhaps best be seen from FIG. 4, the torsion member D is terminated by a lever arm 50 which has a round boss 51 that projects from the right into the mounting aperture 20 of the anchor block 18. The boss 51 has an axially facing through hole 52 which is non-rotatively secured to the end of torsion member D, as by a press fit. Projecting radially from boss 51 is a thumb tab 53 which acts as a lever by means of which the end of torsion member D may be rotated. Since the lever arm 50 is non-rotatively secured to the torsion member D by the boss 51, pressure applied to the side of the thumb tab 53 will result in rotational torque being applied to the end of the torsion member D.

To improve the security of the force fit at the boss 51, a stuffer cap 54 is inserted over the end of the torsion member D before the lever arm 50 is pressed on. As may perhaps best be seen in FIG. 18, the stuffer cap 54 is provided with axially projecting legs 55 that nest peripherally around the non-circular periphery of the torsion member D in such a way as to make the finished assembly more nearly circular. The projecting legs 55 are splined on the effective outer diameter of the stuffer cap 54 to prevent the assembly from rotating within the boss 51 of the lever arm 50 when force is applied at the thumb tab 53. Captured and compressed between the lever arm 50 and the coupling ring 26 is an axially active, resilient means in the form of a compression spring 56, which tends to urge the coupling ring 26 to the left as viewed in FIG. 4.

Mounted on the extremities of the sleeve C axially to the left of the sleeve 40 as viewed in FIG. 4 and freely rotatable with regard to the torsion member D which it surrounds is a bushing 62 having an enlarged diameter portion 64 within which a portion of the sleeve 40 is received. This bushing 62 acts as a bearing permitting rotation of the sleeve 40 with respect to the sleeve C.

When adjustment of the anchor position of the end of the torsion member D is called for, the operator will use tool 57 (see FIG. 11), which is provided with curved jaws 58 that fit over the sleeve C and bushing 62 in the manner of a spanner wrench. As shown in FIGS. 7-10, when the tool 57 is slipped over the sleeve C and bushing 62 it may then be moved towards the anchor block 18, with the jaws 58 entering two diametrically opposed clearance cuts 59 in the anchor block 18. Rotation of the tool 57, when inserted into the clearance cuts 59, is limited by projecting overhangs 60 in anchor block 18.

Figure 18:
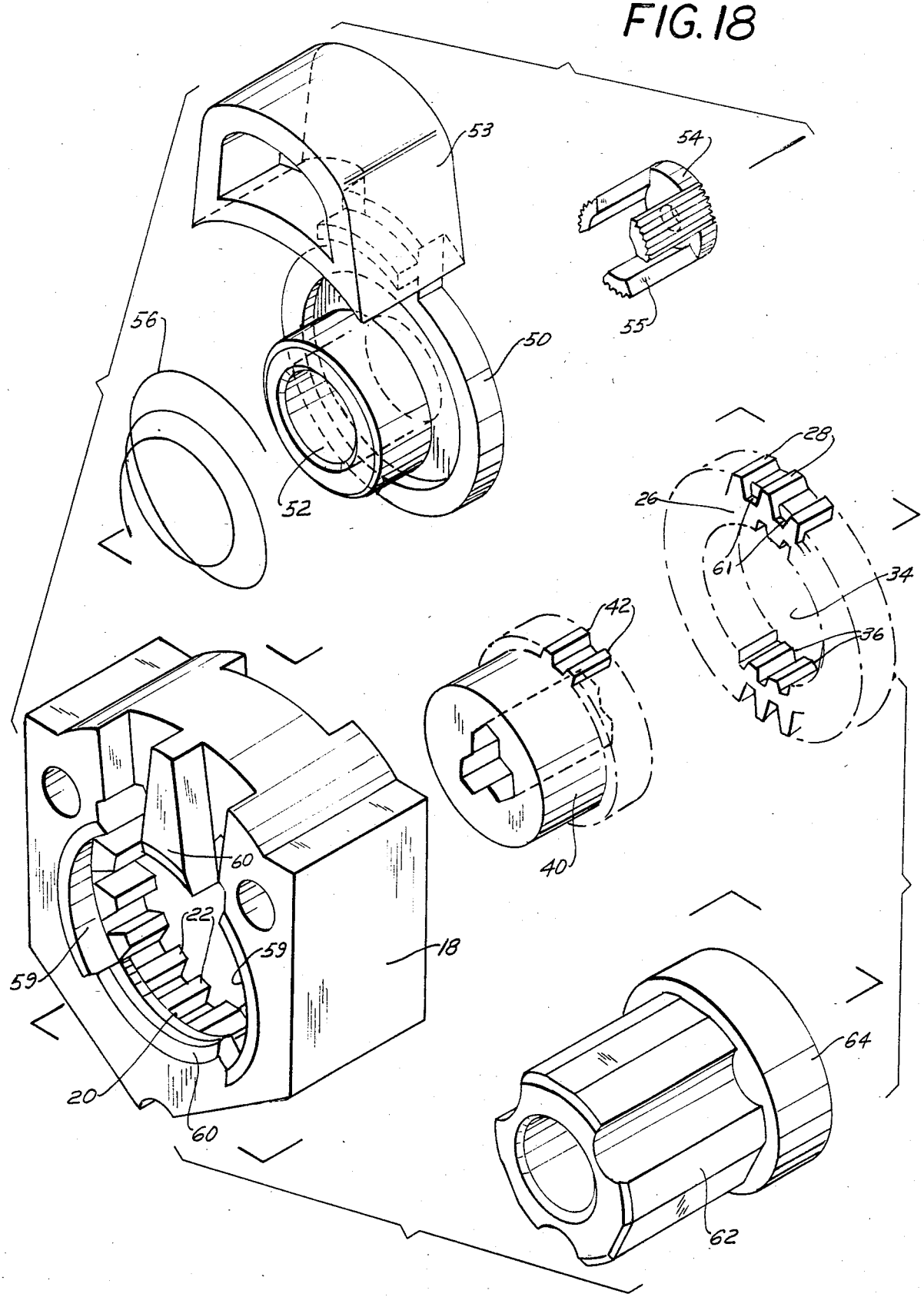
FIG. 18 is a three quarter perspective exploded view of the parts by means of which the anchor position of the end of the torsion member may be adjusted.
Figure 19:
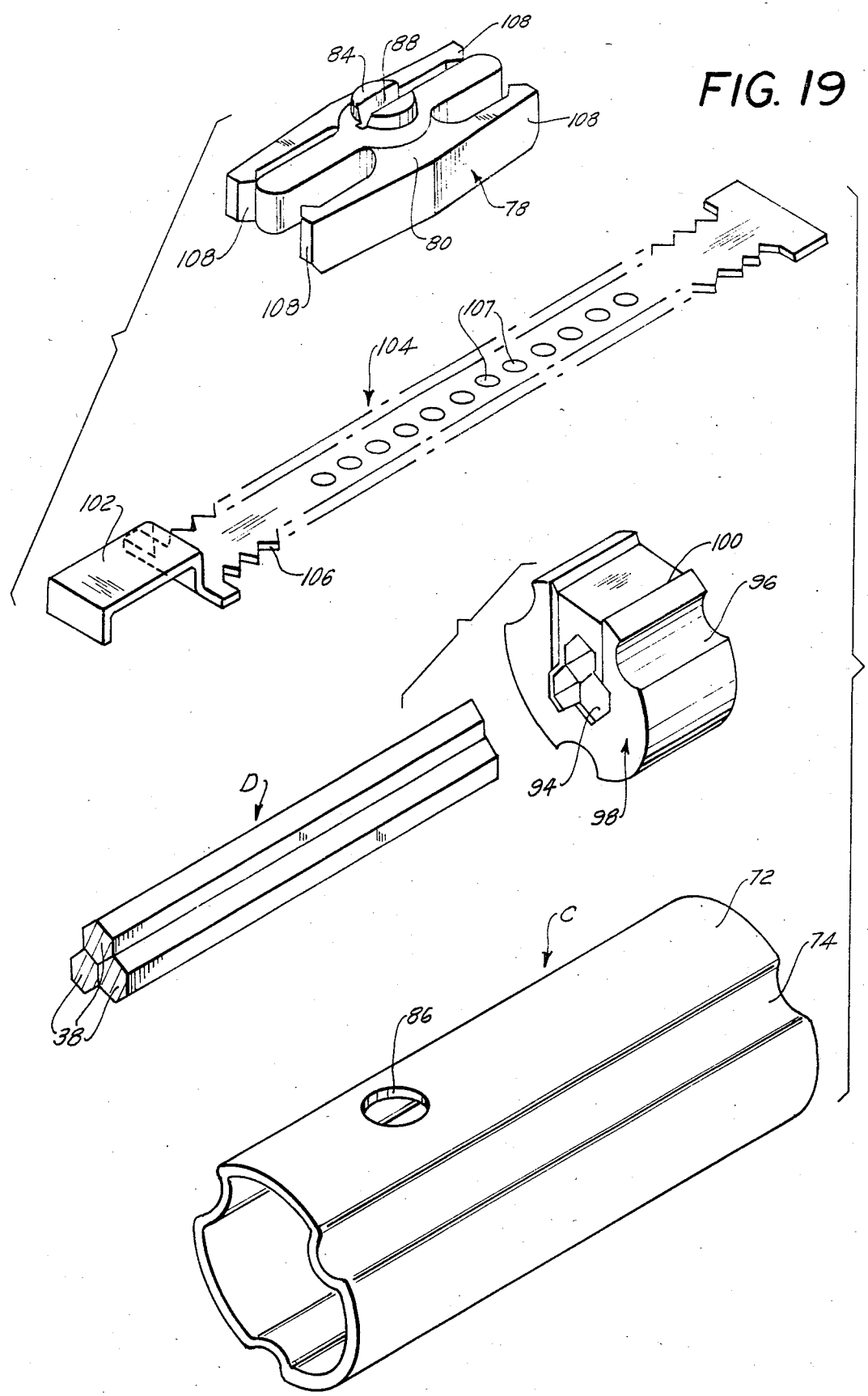
FIG. 19 is a three quarter perspective exploded view of the parts by means of which the effective length of the torsion member may be adjusted.

Each jaw 58 of the tool 57 has a projecting tab 61 located such that when the jaws 58 are inserted into the clearance cuts 59 and rotated until they contact one end of the projecting overhangs 60, both tabs 61 will engage in pockets 62 located in the coupling ring 26 between the teeth 28 (see FIG. 18). When the tabs 61 are engaging the pockets 62, the tool 57 may be pushed deeper into the anchor block 18, thus pushing the coupling ring 26 away from the sleeve 40 and compressing the spring 56.

Figure 9:
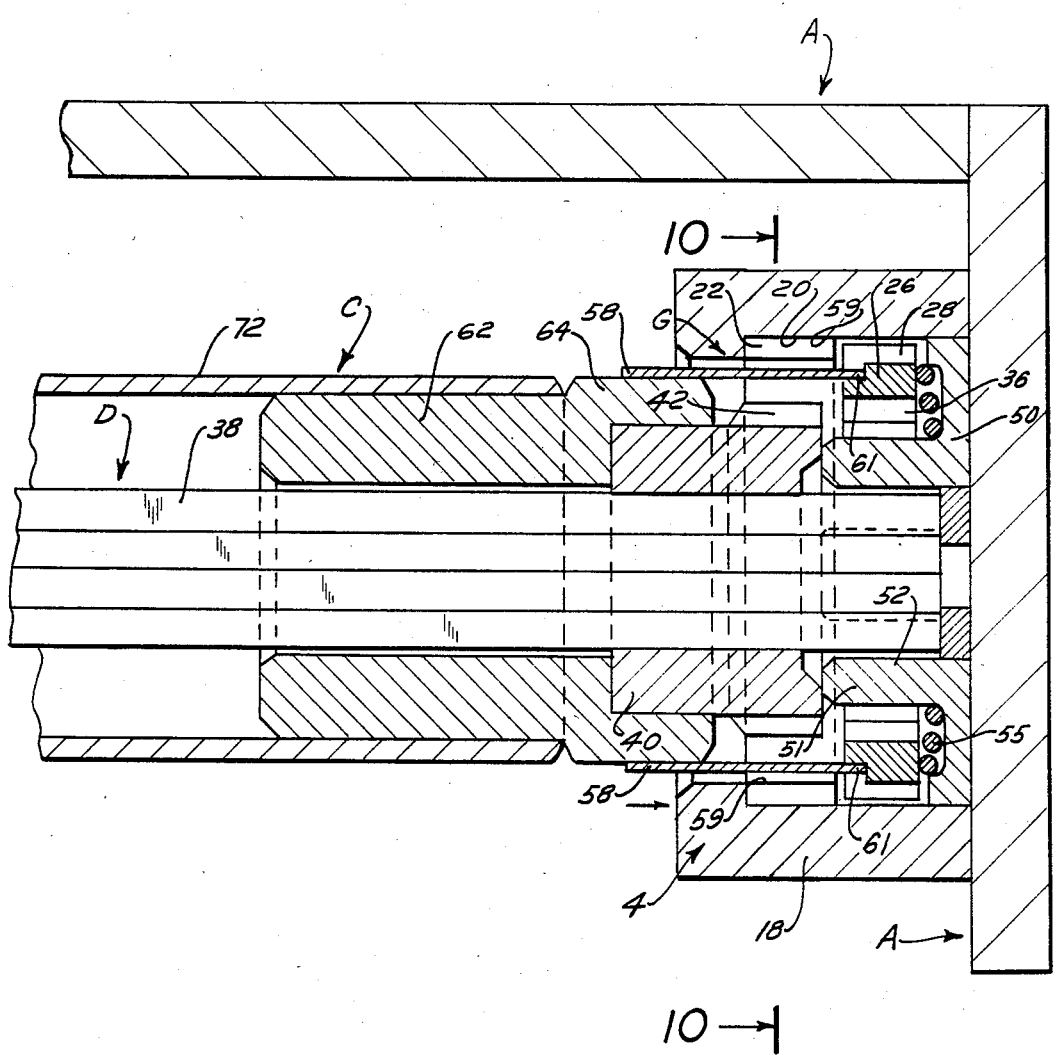
FIG. 9 is a view similar to FIG. 8 but showing the adjusting parts in an extreme position.
Figure 10:
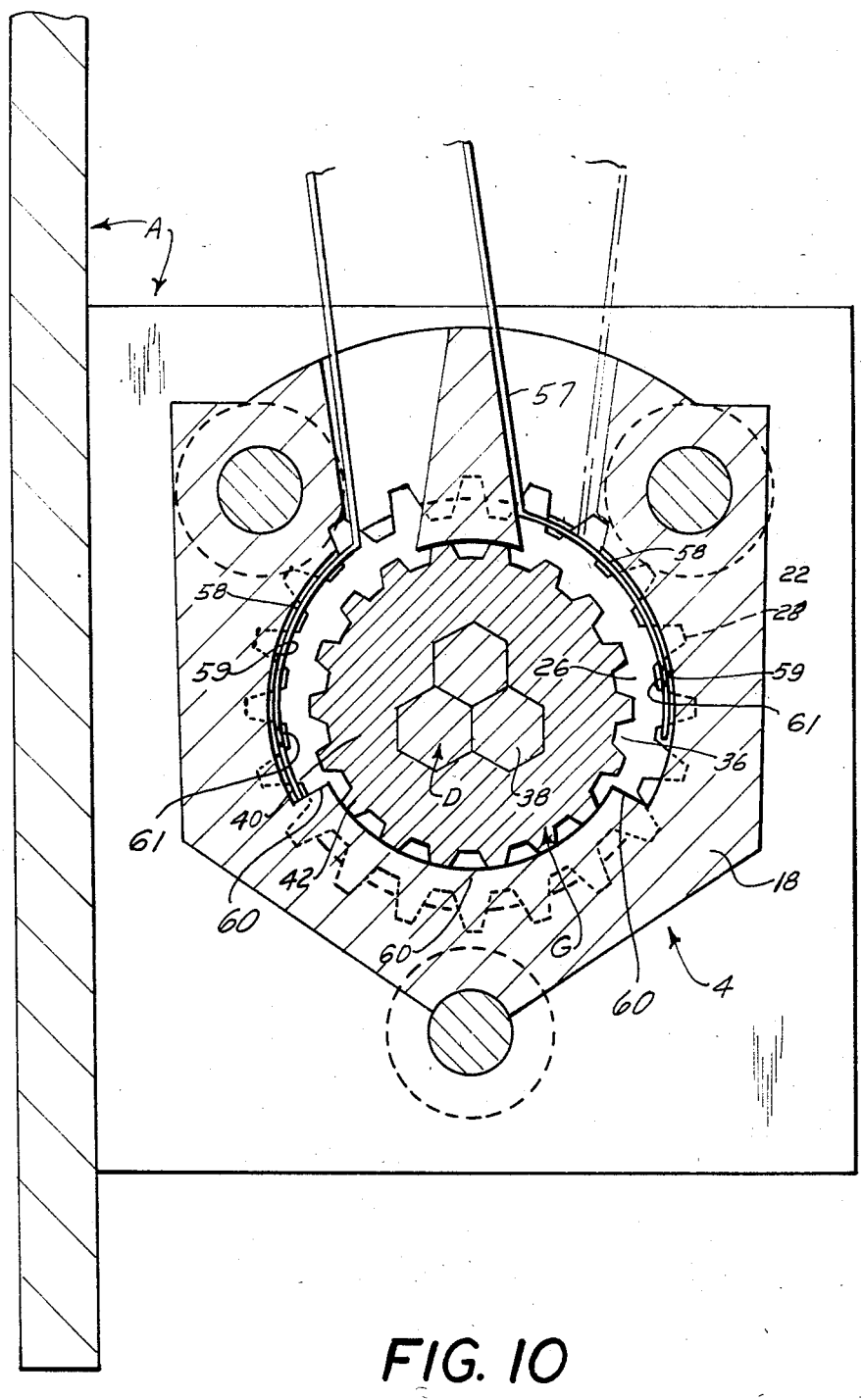
FIG. 10 is a cross-sectional view taken along the line 10—10 of FIG. 9.

When the coupling ring 26 is so moved, the teeth 36 will first disengage from the teeth 42 on the sleeve 40 (see FIG. 8), and then, when the spring 26 is compressed almost flat, the teeth 28 will disengage from the teeth 22 in the anchor block 18 (see FIG. 9). In this fully disengaged position (with the tabs 61 still engaging the pockets 62) the coupling ring 26 may be rotated by rotating the tool 57 until the jaws 58 contact the opposing ends of the projecting overhangs 60. This rotational movement of the tool 57 is preferably limited by the projecting overhangs 60 in such a way that the coupling ring 26 may be advanced exactly one tooth, and one tooth only (with respect to the anchor block 18) at each insertion of the tool 57.

When the tool 57 has been inserted, and the coupling ring 26 advanced (or retarded, depending on the direction of rotation desired) one tooth as described above, removal of the tool 57 will permit the coupling ring 26 to re-engage with the anchor block 18, urged by the spring 56. If the tool 57 has been fully rotated within the limits of the projecting overhangs 60, the teeth 28, 22 will be aligned for proper re-engagement when the tool 57 is removed. However, the teeth 36, 42 will not be aligned for proper engagement after rotation of the coupling ring 26 due to the difference in pitch between the two sets of teeth.

To permit the teeth 36, 42 to re-engage at this point, rotational force must be applied to the thumb tab 53 of the lever arm 50 in the direction opposite that of the prior movement of the coupling ring 26. When so applied, this pressure will cause the end of the torsion element D to rotate, carrying the sleeve 40 with it. When the sleeve 40 has been thus rotated by an angular amount equal to the difference in pitch between teeth 28 and 36, then the teeth 36, 42 will be properly aligned for re-engagement, and the coupling ring 26 will be urged into full engagement with the sleeve 40 by the spring 56.

By repeating the entire sequence described above, the relative rotational anchor position of the torsion element D can be altered by any multiple of the difference in pitch between the teeth 28, 36 (in the case illustrated, any multiple of 2°).

Figure 3:
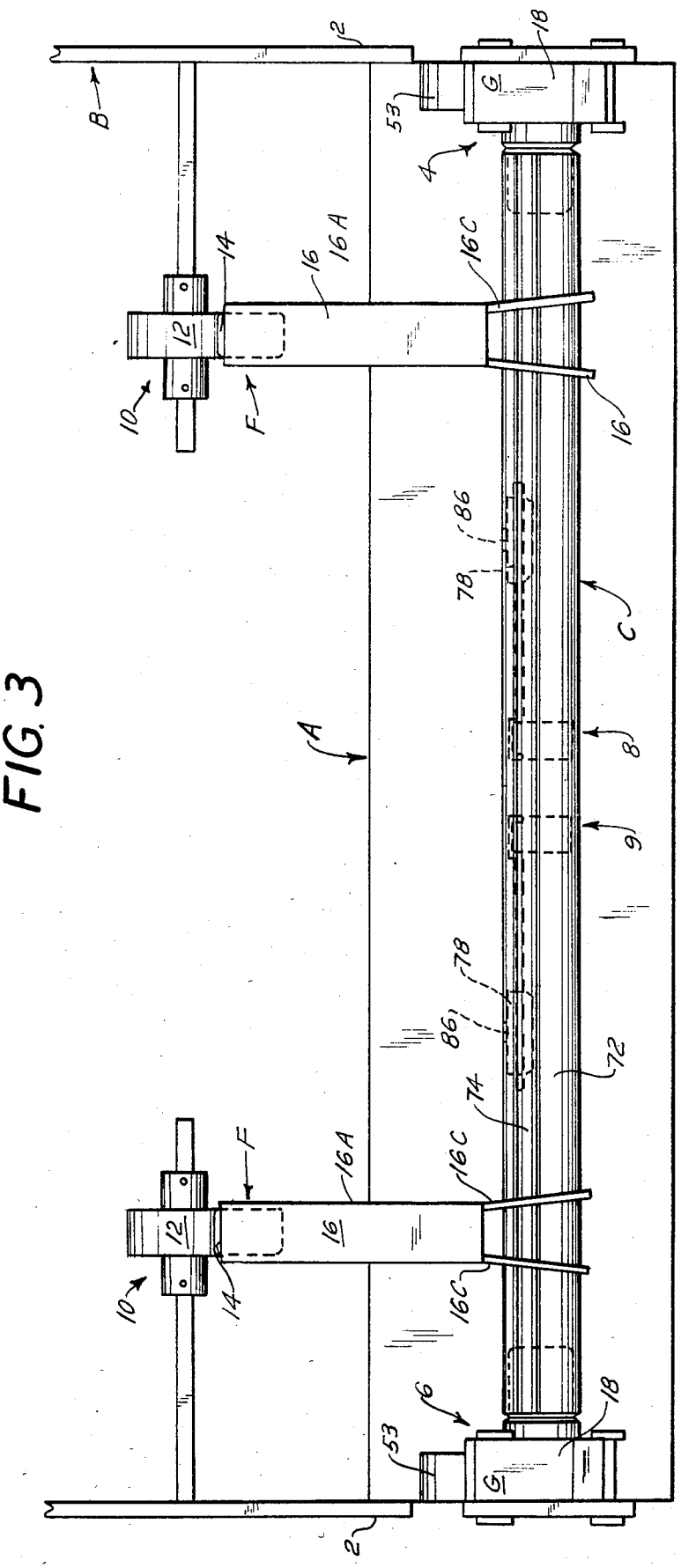
FIG. 3 is a side elevational view of the torsion device of FIG. 1.

The sleeve C is journaled on the smaller diameter portion of the bushing 62. While the sleeve C may take a number of forms, it is preferred, in accordance with the present invention, that it have a fluted cross-sectional shape, thus defining, extending axially along its length, outward projections 72 and inner projections 74. The arms 16 which carry the cam followers 14 are keyed to the sleeve C for rotation therewith by having apertures 76 shaped to mate with the fluted periphery of the sleeve C. This enables the arms 16 to be slid along the length of the sleeve C to that position where, in a given installation, the cooperating cams 12 are located. In order to assist in retaining the arms 16 in their desired axial position relative to the sleeve C, the arms 16 are advantageously formed from a single metal sheet defining spaced side arms 16A connected by wall 16B which extends only partway down the length of the arm, the arm portions 16C located below the wall 16B carrying apertures 76 slightly larger than the cross-section of the sleeve C and being resiliently spread apart, as may perhaps best be seen in FIGS. 3 and 20. When thus spread they firmly grasp the sleeve C and prevent the arm 16 from moving axially thereof. If adjustment of the positioning of the arm 16 along the length of the sleeve C is desired, one need merely grasp the extending ends of the arm parts 16C and push them toward one another, thus destroying the grip of those parts on the sleeve 16 and permitting the arm position to be adjusted. Moreover, the rotative position of the arm 16 relative to the sleeve C may be grossly adjusted within steps permitted by the fluting on the sleeve C. As here specifically disclosed there are three flutes, and hence there are three permissible relative rotative positions for the arm 16. If a greater number of flutes be provided, there will be a correspondingly greater number of possible relative rotative positions for the arms.

Although, as has been described, the sleeve C rotates with the arms 16 and the bushing 62, means must be provided for non-rotatively connecting the sleeve C to the torsion member D at points spaced from the anchored ends 4, 6 of that torsion member in order that the torsion member be twisted when relative movement occurs between the parts A and B and, as pointed out in the aforementioned application Ser. No. 477,337, it is desirable that means be provided to axially adjust the point where the sleeve C is non-rotatively connected to the torsion member D, thereby to vary the effective length of the torsion member and hence its spring rate. The structures disclosed for that purpose in the aforementioned patent application, while effective, have been found to be specifically wanting in certain applications from the point of view of accessibility, range of adjustability, and adaptability to standard constructions.

In the improved adjusting structure here disclosed, the sleeve C is appreciably radially spaced from the torsion member D, and a guide 78 is interposed therebetween. That guide 78 has a body portion 80 which is captured between the inner surface of the sleeve C and the link 104, which in turn rests on the torsion member D. The guide 78 is fixed in place axially along the sleeve C by means of an upwardly extending part 84 which extends through an aperture 86 in the sleeve C, the part 84 having a slot-like through aperture 88 aligned axially to the body 80. The aperture 86 is so located on the sleeve C as to position the guide 78 appropriately for the desired approximate effective length of the torsion member D.

Slidably mounted on the torsion member D and rigidly rotatable therewith, as by having an internal aperture 94 which mates with the outer periphery of the torsion member D and also being axially slidable with respect to but rotatable with the sleeve C, as by having an outer periphery 96 engaging the fluted interior of the sleeve C, is a part 98. That part is provided with a slot 100 so that it can be engaged by the hooked end 102 of the link 104 which extends into and through the guide 78 and which is provided with rack-like teeth 106 on each edge and a row of apertures 107 down the middle with centers spaced at twice the pitch of the teeth 106. The link 104 passes under the body 80 of the guide 78 and is held in position by two sets of resilient detent fingers 108 incorporated in the guide 78 in such a way that they straddle the link 104 and engage the teeth 106 along each edge. This fixes the axial position of the part 98 which serves to rotatively connect the sleeve C to the torsion member D, thereby defining the location of the connection point 8 or 9, as the case may be. The effective length of the torsion member D (the distance between points 4 and 8 and points 6 and 9 respectively) is measured from the part 98 to the anchored end of the torsion member D.

Figure 11:
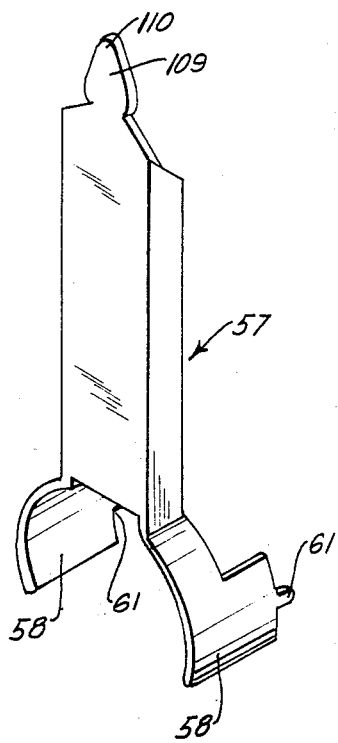
FIG. 11 is a three-quarter perspective view of an adjusting tool.

If it is desired to vary the effective length of the torsion member D, the tool 57 of FIG. 11 may be used. That tool is provided, at its end opposite to the one which carries the jaws 58, with a narrow portion 109 capable of passing down through the aperture 88 and provided at its end with a teardrop-shaped projection 110 which engages the apertures 107 in the link 104. As may best be seen from FIG. 12, when the tool 57 is inserted down through the aperture 88 it engages the link 104 by being received in one of the apertures 107. If the tool is then swung in one direction or the other axially of the device, as indicated in FIG. 12, the link 104 will be axially moved and the part 98 will be correspondingly axially moved, either toward or away from the anchored end of the torsion member D depending upon the manner in which the tool 57 is manipulated. When the tool 57 is removed, the detent fingers 108 engage the teeth 106 to retain part 98 in position, and the torsion member D will then function with a different effective length.

With the construction here disclosed, tension devices can readily be constructed from standard components to accommodate widely varying geometries and operating requirements. Sleeves and torsion members may be formed in long lengths and simply cut to size to accommodate the spacial requirements of a given installation. All other parts may simply be slid or forced into place on the sleeve or torsion member after the latter have been cut to length. Virtually the only manufacturing operation specific to a particular installation will be the providing of the holes 86 in the sleeve C at appropriate locations. With those standard parts, assembled in such a simple and effective fashion, wide variation in spring rate, close control of the anchored position of the torsion spring ends, and ready adjustment of both can be accomplished even after installation, along with appropriate positioning of the cam follower arms to correspond to the physical requirements of the particular job.

While but a single embodiment of the present invention has been here specifically disclosed, it will be apparent that many variations may be made therein, all within the scope of the present invention, as defined in the following claims.

I claim:

1. In a variable tension device comprising a support adapted to be relatively fixedly mounted, an elongated torsion member non-rotatably secured to and extending axially from said support, a sleeve surrounding said torsion member and rotatable thereover, means for non-rotatably securing said sleeve to said torsion member at a point axially spaced from said support, and means for operatively connecting said sleeve to an external object rotatably movable relative to said support; the improvement which comprises said sleeve-torsion member securing means comprising (a) a part mounted on said torsion member inside said sleeve, non-rotatably secured to said torsion member and said sleeve, and axially slidable relative to said torsion member and said sleeve, (b) said sleeve having an opening located axially between said part and said support, and (c) a link engaged with said part, extending toward said support, and passing under said sleeve opening, said sleeve opening providing access to said link, whereby said link may be engaged through said opening and moved axially, thereby to axially move said part to adjust the spacing between said part and said support, whereby the effective length of said torsion member can be varied at any time desired.

2. In the device of claim 1, (d) a guide inside said sleeve and freely rotatable with respect to said torsion member through which said link extends, said guide having an aperture registering with said sleeve opening through which an element may extend to engage said link and move it axially.

3. The device of claim 2, in which said guide and said link have interengaging parts which when interengaged fix the axial position of said link.

4. In the device of claim 3, resilient means urging said parts into interengagement, said element extending through said guide aperture being effective to cause relative movement of said link with respect to said guide when axial adjustment of said link is desired.

5. The device of claim 4, in which said guide has a resilient part engaging said link, thereby to comprise said resilient means.

6. The device of claim 1, in which said sleeve has a radially inward projection extending axially therealong, and said part mounted on said torsion member is provided with a surface mating with said projection, thereby to render said part rotatable with and axially adjustable relative to said sleeve.

7. The device of claim 6 in which said sleeve also has a radially outward projection extending axially therealong, said means for operatively connecting said sleeve to an external element comprising a member received on said sleeve and having a surface mating with said outward projection, thereby to make said means rotatable with and axially adjustable relative to said sleeve.

8. The device of claim 7, in which said means comprises a pair of members spaced from one another axially to tightly grip said sleeve, thereby to fix the position of said means axially of said sleeve, said members when moved against the action of said resilient means loosely gripping said sleeve, thereby enabling axial adjustment of said means relative to said sleeve.

9. In a variable torsion device comprising a support adapted to be relatively fixedly mounted, an elongated torsion member non-rotatably secured to and extending axially from said support, a sleeve surrounding said torsion member and rotatable thereover, means for non-rotatably securing said sleeve to said torsion member at a point axially spaced from said support, and means for operatively connecting said sleeve to an external object rotatably movable relative to said support; the improvement which comprises said sleeve having an outward projection extending axially therealong, said means for operatively connecting said sleeve to an external object comprising a member received on said sleeve and having a surface mating with said outward projection, thereby to make said means rotatable with and axially adjustable relative to said sleeve, said sleeve having an internal projection extending axially therealong, said means for non-rotatably securing said sleeve to said torsion member comprising a part non-rotatably and axially slidably mounted on said torsion member, said means being provided with a surface mating with said internal projection, thereby to make said part rotatable with and axially adjustable relative to said sleeve.

10. In the device of claim 9, resilient means urging said members axially to tightly grip said sleeve, thereby to fix the position of said means axially of said sleeve, said members when moved against the action of said resilient means loosely gripping said sleeve, thereby enabling axial adjustment of said means relative to said sleeve.

11. The device of claim 9 in which said means comprises a pair of members.

12. The device of claim 9, in which said projections comprise fluting.

13. In a variable tension device comprising a support adapted to be relatively fixedly mounted, an elongated torsion member extending axially from one side of said support, means non-rotatably securing said torsion member to said support, and means for operatively connecting an external object, rotatably movable relative to said support, to said torsion member at a point axially spaced from said support; the improvement in the means for securing said torsion member to said support which comprises:
(a) said support having a mounting aperture with internal teeth,
(b) a coupling member received within said aperture, having external teeth mating with said internal teeth to said aperture to couple said member to said support, and having an axially facing opening with internal teeth;
(c) a part operatively connected to said torsion member, received within said axially facing opening, and having external teeth mating with said internal teeth of said axial opening to couple said part to said member,
(d) said coupling member being movable into and out from coupling engagement with said support and said part, and
(e) actuating means operatively connectable to said coupling member for moving said coupling member into and out of engagement with said support and said part and for rotating said coupling member.

14. The device of claim 13, in which the pitch of said mounting aperture internal teeth and said axially facing opening internal teeth are different.

15. In the device of claim 13, resilient means active on said coupling member to bias it into engagement with said support and said part.

16. The device of claim 15, in which said coupling member, when moved by said resilient means toward its engaged position, first engages with said support and then with said part.

17. The device of claim 15, in which said torsion member extends through said mounting aperture to a point accessible at the other side of said support and there carries a second member, said resilient means being active between said second member and said coupling member.

18. The device of claim 17, in which said second member rotates with said torsion member and is manually accessible from the exterior of said device, thereby to cause rotation of said torsion member when said second member is actuated.

19. The device of claim 15, in which said torsion member extends through said mounting aperture to a point accessible at the other side of said support and there carries a second member which rotates therewith and is manually accessible from the exterior of said device, thereby to cause rotation of said torsion member when said second member is actuated.

20. The device of claim 19, in which said coupling member, when moved by said resilient means toward its engaged position, first engages with said support and then with said part.

21. In the deice of claim 13, a sleeve surrounding said torsion member and rotatable thereover, and a bearing member engaging said sleeve and said torsion member and rotatably supporting the former on the latter.

22. The device of claim 13, in which said axially facing opening of said coupling member extends therethrough, said torsion member passes through said axial opening from said one side of said support to the other side thereof and there carries a second member, resilient means active between said second member and said coupling member to urge said coupling member to move in a direction from said second member toward said support.

23. The device of claim 22, in which said second member rotates with said torsion member and is manually accessible from the exterior of said device, thereby to cause rotation of said torsion member when said second member is actuated.

24. The device of claim 13, in which said axially facing opening of said coupling member extends therethrough, said torsion member passes through said axial opening from said one side of said support to the other side thereof and there carries a second member, resilient means active between said second member and said coupling member to urge said coupling member to move in a direction from said retaining member toward said support to first engage said support and then engage said part operatively connected to said torsion member.

25. The device of claim 24, in which said second member rotates with said torsion member and is manually accessible from the exterior of said device, thereby to cause rotation of said torsion member when said second member is actuated.

26. In a variable tension device comprising a support adapted to be relatively fixedly mounted, an elongated torsion member extending axially from one side of said support, means non-rotatably securing said torsion member to said support, and means for operatively connecting an external object, rotatably movable relative to said support, to said torsion member at a point axially spaced from said support; the improvement in the means for securing said torsion member to said support which comprises:

(a) said support having a mounting aperture with internal teeth, (b) a coupling member received within said aperture, having external teeth mating with said internal teeth in said aperture to couple said member to said support, and having an axially facing opening with internal teeth;

(c) a part operatively connected to said torsion member, received within said axially facing opening, and having external teeth mating with said internal teeth of said axial opening to couple said part to said member, and (d) said coupling member and said part being relatively axially movable into coupling engagement.

27. The device of claim 26, in which the pitch of said mounting aperture internal teeth and said axially facing opening internal teeth are different.

28. In the device of claim 26, a sleeve surrounding said torsion member and rotatable thereover, and a bearing member engaging said sleeve and said torsion member and rotatably supporting the former on the latter.

29. A variable tension device subassembly, adapted to be operatively connected between two external relatively movable parts so as to exert a variable force between said parts as they are relatively moved, said subassembly comprising an elongated sleeve having an axis and ends, an elongated torsion means extending axially within said sleeve, anchoring means fixedly engaged with said torsion means adjacent both ends thereof, said sleeve being rotatable relative to said anchoring means and said torsion means, said anchoring means having keying means exposed at both ends of said sleeve and adapted to be non-rotatably engaged with one of said external parts, means inside said sleeve located between and spaced from said anchoring means non-rotatably connecting said sleeve and said torsion means, and means on the outside of said sleeve for connecting said sleeve to the other of said external parts, whereby said subassembly can be used as a unit, said means inside said sleeve being axially adjustably slidable relative to said torsion means and said sleeve, whereby the location of the point along said torsion means where said inside means operatively engages said torsion means can be adjusted at any time desired and whereby said means inside said sleeve can be assembled with said sleeve and said torsion means by axially sliding it into said subassembly from an end thereof.

30. The device of claim 29, in which said means on the outside of said sleeve extends longitudinally of said sleeve for an appreciable distance thereby to permit adjustment of the location along said sleeve where said other of said external parts is connected thereto.

31. The device of claim 29, in which said sleeve is journaled on said anchoring means, and in which said means on the outside of said sleeve extends longitudinally of said sleeve for an appreciable distance thereby to permit adjustment of the location along said sleeve where said other of said external parts is connected thereto.

32. The subassembly of claim 29, in which said sleeve is journaled on said anchoring means.

33. A variable tension device subassembly, adapted to be operatively connected between two external relatively movable parts so as to exert a variable force between said parts as they are relatively moved, said subassembly comprising an elongated sleeve having an axis and ends, an elongated torsion means extending axially within said sleeve, anchoring means fixedly engaged with said torsion means adjacent both ends thereof, said sleeve being rotatable relative to said achoring means and said torsion means, said anchoring means having keying means exposed at both ends of said sleeve and adapted to be non-rotatably engaged with one of said external parts, means inside said sleeve located between and spaced from said anchoring means non-rotatably connecting said sleeve and said torsion means, and means on the outside of said sleeve for connecting said sleeve to the other of said external parts, whereby said subassembly can be used as a unit, said sleeve being provided along a substantial portion of its length with internal and external fluting, said internal fluting cooperating with said means inside said sleeve to non-rotatably connect those two parts and permit axial adjustable positioning of said inside means, and the external fluting defining said outside means and permitting adjustment of the location along said sleeve where said other of said external parts is connected thereto.

* * * * *